United States Patent
Thesing

(10) Patent No.: US 6,830,105 B2
(45) Date of Patent: Dec. 14, 2004

(54) PROPPANT FLOWBACK CONTROL USING ELASTOMERIC COMPONENT

(75) Inventor: André Thesing, Leiderdorp (NL)

(73) Assignee: Halliburton Energy Services, Inc., Duncan, OK (US)

( * ) Notice: Subject to any disclaimer, the term of this patent is extended or adjusted under 35 U.S.C. 154(b) by 330 days.

(21) Appl. No.: 10/108,274

(22) Filed: Mar. 26, 2002

(65) Prior Publication Data

US 2003/0186820 A1 Oct. 2, 2003

(51) Int. Cl.$^7$ .............................................. E21B 43/04
(52) U.S. Cl. ..................... 166/280.1; 166/281; 166/295
(58) Field of Search .............................. 166/280.1, 281, 166/308.1, 295; 507/922, 924

(56) References Cited

U.S. PATENT DOCUMENTS

| | | | |
|---|---|---|---|
| 4,649,998 A | 3/1987 | Friedman | 166/294 |
| 5,420,174 A * | 5/1995 | Dewprashad | 523/130 |
| 5,697,440 A * | 12/1997 | Weaver et al. | 166/281 |
| 5,775,425 A | 7/1998 | Weaver et al. | 166/276 |
| 5,833,000 A | 11/1998 | Weaver et al. | 166/276 |
| 5,839,510 A | 11/1998 | Weaver et al. | 166/276 |
| 5,860,770 A * | 1/1999 | Hunt | 405/264 |
| 6,047,772 A | 4/2000 | Weaver et al. | 166/276 |
| 6,059,034 A | 5/2000 | Rickards et al. | 166/280 |
| 6,209,643 B1 | 4/2001 | Nguyen et al. | 166/276 |
| 6,599,863 B1 * | 7/2003 | Palmer et al. | 507/219 |
| 2003/0224165 A1 * | 12/2003 | Anderson et al. | 428/403 |
| 2004/0043906 A1 * | 3/2004 | Heath et al. | 507/200 |

FOREIGN PATENT DOCUMENTS

| | | | |
|---|---|---|---|
| EP | 0834644 A2 | 4/1998 | E21B/43/02 |
| EP | 0853186 A2 | 7/1998 | E21B/43/02 |

* cited by examiner

*Primary Examiner*—William Neuder
(74) *Attorney, Agent, or Firm*—Robert A. Kent; Todd E. Albanesi

(57) ABSTRACT

According to the invention, a method of treating a subterranean formation is provided comprising the steps of: (a) forming a mixture comprising: (i) a particulate, (ii) an elastomer-forming component in a liquid form or in a solvent solution, and (iii) a fluid for carrying the particulate through the well into the subterranean formation; and (b) introducing the mixture into the subterranean formation. The elastomer-forming component has the following characteristics under laboratory testing: (a) the component, by itself or with a curing agent, is capable of being cured to form an elastomeric material, and (b) the component, at a test level of 2 percent by weight over the particulate alone and under conditions of sufficient stress loading, is capable of forming the particulate into a flexible and coherent mass.

39 Claims, 1 Drawing Sheet

PROPPANT FLOWBACK CONTROL USING ELASTOMERIC COMPONENT

BACKGROUND OF THE INVENTION

The present invention broadly relates to hydrocarbon production from a subterranean formation. More particularly, this invention relates to proppant flowback control (also known as proppant back production control).

SUMMARY OF THE INVENTION

According to the invention, a method of treating a subterranean formation is provided comprising the steps of: (a) forming a mixture comprising: (i) a particulate, (ii) an elastomer-forming component in a liquid form or in a solvent solution, and (iii) a fluid for carrying the particulate through the well into the subterranean formation; and (b) introducing the mixture into the subterranean formation. The elastomer-forming component has the following characteristics under laboratory testing: (a) the component, by itself or with a curing agent, is capable of being cured to form an elastomeric material, and (b) the component, at a test level of 2 percent by weight over the particulate alone and under conditions of sufficient stress loading, is capable of forming the particulate into a flexible and coherent mass.

This and further aspects and advantages of the invention will be described in more detail in the following detailed description of preferred embodiments of the invention.

BRIEF DESCRIPTION OF THE DRAWING

The accompanying drawing is incorporated into and forms a part of the specification to illustrate an example according the present invention. Together, the written description and the drawing serve to explain the principals of the invention. The drawing is only for the purpose of illustrating a preferred example of how the various aspects of the invention can be made and used and is not to be construed as unnecessarily limiting the invention to only the illustrated and described example. Various features and advantages of the present invention will be apparent from a consideration of the drawings in which.

DETAILED DESCRIPTION OF PREFERRED EMBODIMENTS OF THE INVENTION

Figure 1:
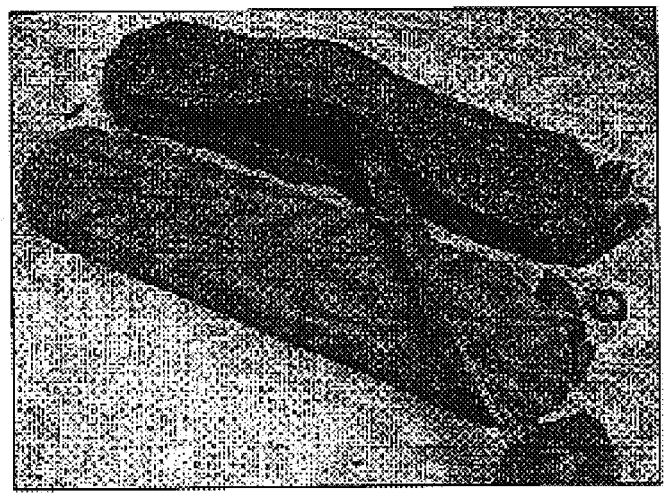
FIGS. 1 and 2 are photographs of a particulate and an elastomer-forming component according to an example of the invention after having been formed into a flexible and coherent mass.

The present invention will now be described in more detail regarding the presently most preferred embodiments of the invention and the best mode presently known for practicing the invention.

The present invention generally relates to the field known as proppant flowback control or proppant back production control. The problems associated with this field are encountered in a subterranean environment that is difficult or impossible to directly observe and study. Accordingly, as for many technologies employed in the arts relating to hydrocarbon production from subterranean formations, some of the parameters for this invention are best studied and defined under laboratory conditions that attempt as nearly as practical to simulate various subterranean conditions.

For the purposes of this invention, specific laboratory tests have been selected to study some of the problems encountered in proppant flowback control and those types of tests have also been used to help define the present invention. Specifically, the following tests have been selected: a test procedure for evaluating short-term proppant pack conductivity, a test procedure for evaluating the "crush resistance" of a particulate for use in a proppant pack, and test procedure for evaluating the proppant flowback. The conditions of each of these tests can be adjusted as desired and appropriate to simulate various subterranean conditions. Each of these testing procedures is briefly described below.

As is well known in the art, the short-term conductivity of a particulate used in a proppant pack can be illustrated using an American Petroleum Institute ("API") approved simulated fracture cell, according to the general procedures specified more particularly in the "Recommended Practices for Evaluating Short-Term Proppant Pack Conductivity," API Recommended Practice 61 (RP 61) First Edition, Oct. 1, 1989.

According to this general procedure, the simulated fracture cell uses two cores of a representative subterranean formation.

The cores are positioned in the cell to define a proppant bed size of about 7 inches (18 cm) in length, about 1.5 inches (3.8 cm) in width, and about 0.25 inches (0.6 cm) in space between the two cores. Such a cell simulates a fracture created in a subterranean formation.

The proppant bed in the API cell is initially prepacked with the particulate and any other material to be tested. The cell is pre-packed by introducing the coated particulate into the cell in a fluid suspension. The fluid used can simulate the type of fluid that can be used for introducing the particulate or coated particulate into a subterranean formation.

The API cell is fitted with a 0.3 inch (0.8 cm) diameter hole at one end to simulate a perforation. This is fitted with a screen to maintain the proppant pack in place.

According to the API procedure, the flowing medium can be water, diesel, or kerosene, or other well fluids. The flowing medium is selected to simulate well conditions. The conductivity of a proppant pack can be significant different for different types of flowing medium.

The API cell is placed in a hydraulic press to apply stress loadings to simulate the stress loadings in a fracture formed in a subterranean formation. According to the general testing procedure, the conductivity of the pack can be measured at any practical and desirable stress loadings, usually starting at about 1,000 psi.

Other factors that can impact the measured conductivity of a proppant pack include, for example, temperature, and even merely the passage of time under an applied closure stress and the other conditions. The different experience of the technician running the tests can also be a factor.

Thus, for best results, the conductivity testing should be conducted in the same way each time, and most preferably even by the same person. Furthermore, because of the complexity of the systems being simulated, there is some natural variability from one test to the next. For example, conductivity test measurements may be expected to vary in the range of about 10% to 20% from one test to the next. Thus, it is generally preferred, although not always necessary, that the testing should be repeated at least two and more preferably at least three times and an average of the conductivity measurements be used. If a particular test out of a number of tests is shown to probably be an aberration using widely accepted statistical analysis techniques, such a result can properly be excluded from the average of the measurements. While these conductivity testing procedures do not provide absolutely consistent measurements, such testing is widely accepted in the art as being at least reasonably reliable and at least reasonably consistent for the purposes of the testing.

At a minimum, a particulate for use as a proppant should be sufficiently strong to be able to withstand substantial crushing under the stress cycles of the subterranean formation into which it is intended to be deposited. Otherwise, as the particulate begins to be crushed under the increasing stress loadings, the crushed pieces of particulate will begin to plug the pore throats between the uncrushed pieces of the particulate, which will reduce the conductivity of the proppant pack. Ultimately, the particulate would be ground to dust.

The strength of a particulate is known in the art as "crush resistance," which can be measured according to an official API RP 56/58 procedure. Of course, certain types of particulate materials are much stronger than others. The crush resistance of a particulate is not only dependent on what the particulate is, but also on the size of the particulate. All else being equal, the smaller the particle size, the greater the crush resistance. For example, 12/20 mesh size bauxite would be expected to have a lower crush resistance, and 40/60 mesh size bauxite would be expected to have a higher crush resistance than 20/40 bauxite. Crush resistance is known to also be dependent on other factors, such as temperature and the flowing medium used in the test.

Thus, for example, a typical sand, such as 20/40 mesh Brady or Ottowa sand, is known to have a crush resistance in the range of about 2,000 psi to about 3,000 psi. On the other hand, 20/40 mesh sintered bauxite can withstand a stress loading of in the range of about 8,000 psi to about 14,000 psi without substantial crushing of the particulate. Thus, bauxite could be used as a proppant in a subterranean formation that is expected to subject the particulate proppant to higher stress loadings than sand would be able to withstand. Crush resistance ranges for bauxite are published by Carbo Ceramics, in its "Technical Information" handbook dated 1995.

As used herein, the "lower end of the crush resistance range" is intended to specifically refer to the lower end of the crush resistance range for the particular type and mesh size of particulate. For example, the lower end of the crush resistance range for 20/40 mesh sintered bauxite means a stress loading of about 8,000 psi.

For the same reasons of natural variability in conductivity testing discussed above, it is generally preferred, although not always necessary, that the crush-resistance testing when used for evaluating crush resistance should be repeated at least two and more preferably at least three times and an average of the measurements to be used. If a particular test out of a number of tests is shown to probably be an aberration using widely accepted statistical analysis techniques, such a result can properly be excluded from the average of the measurements To help evaluate a material for use in a proppant pack, the API test can be modified to demonstrate how much of the material would be produced through a simulated perforation under fluid flowback conditions. According to a modification of the API conductivity test described above, the screen is removed from the perforation opening of the simulated fracture cell. Optionally, a sight glass can be provided so that proppant production, if any, at the mouth of the hole can be visually observed.

This modified testing procedure can also be used to measure the ability of a particulate or coated particulate to withstand stress loadings by measuring the degree of any proppant flowback, including, for example, the additional flowback that can be caused by repeated stress cycles.

Cycles of stress loadings can be selected to evaluate proppant flowback under the simulated stress cycles of the well during periods of shut-in and production.

Having described a few of the general laboratory testing procedures used for studying some of the problems encountered in proppant flowback control, the invention can now be described and defined in more detail.

Figure 2:
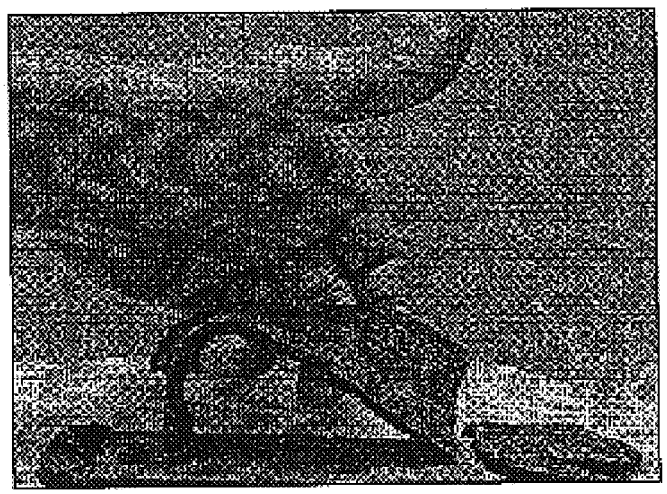

In general, a method of treating a subterranean formation is provided comprising the steps of: (a) forming a mixture comprising: (i) a particulate, (ii) an elastomer-forming component in a liquid form or in a solvent solution, and (iii) a fluid for carrying the particulate through the well into the subterranean formation; and (b) introducing the mixture into the subterranean formation. The elastomer-forming component has at least the following characteristics under laboratory testing: (a) the component, by itself or with a curing agent, is capable of being cured to form an elastomeric material, and (b) the component, at a test level of 2 percent by weight over the particulate alone and under conditions of sufficient stress loading, is capable of forming the particulate into a flexible and coherent mass. As will hereinafter be described in more detail, FIGS. 1 and 2 are photographs of a particulate and an elastomer-forming component according to one example of the invention after having been formed into a flexible and coherent mass. Of course, as illustrated in the Figures, it may be possible to break the mass apart. Furthermore, although not required, it is more preferably that substantially all of the particulate in the sample is associated with the mass.

Another aspect of the invention, has the following characteristic under laboratory conditions: when tested at a test level of 2 percent by weight over the particulate alone and under conditions of sufficient stress loading at about the lower end of the crush resistance range of the particulate, it is capable of forming the particulate into a flexible and coherent mass.

According to yet another aspect of the invention, the component, when tested at a test level of 2 percent by weight over a test sample of 20/40 mesh sintered bauxite alone and under conditions of stress loading at about 8,000 psi and a temperature of about 300° F. (150° C.), is capable of forming the test sample of into a flexible and coherent mass.

According to still another aspect of the invention, the method further comprises at a well site, mixing a particulate, and an elastomer-forming component in a liquid form or in a solvent solution; and subsequently admixing a fluid for carrying the particulate through the well into the subterranean formation to form a mixture. This particular aspect has the advantage of avoiding any premature formation of a mass of particulate that might otherwise require special storage and handling problems and that might make subsequent use of the coated particulate more difficult.

It is to be understood that in some cases the elastomer-forming component may not be self-curing, so that a curing agent can either be included in the mixture or can be introduced into the formation after the particulate and the elastomer-forming component have been introduced into the subterranean formation in a subsequent over-flushing step.

Preferably, the elastomer-forming component has the following characteristic under laboratory testing: after being cured, when tested according to the API "Recommended Practices for Evaluating Short-Term Proppant Pack Conductivity" (a) at a test level of 2 percent by weight of the elastomer-forming component over the particulate alone, (b) using filtered water as the flowing medium, (c) applying a stress loading of about 100% of the lower end of the range of crush resistance of the particulate, and (d) at a temperature of about 300° F. (150° C.), the elastomer-forming component does not reduce the initial conductivity of a particulate by more than 30 percent relative to the particulate alone. More preferably, the elastomer-forming component does not reduce the initial conductivity of a particulate by more than 20 percent relative to the particulate alone.

Preferably, the elastomer-forming component has the following characteristic under laboratory testing: after being cured, when tested according to the modified API "Recommended Practices for Evaluating Short-Term Proppant Pack Conductivity" for measuring flowback (a) at a test level of 2 percent by weight of the elastomer-forming component over the particulate alone, (b) using filtered water as the flowing medium, (c) under a stress loading of about 100% of the lower end of the range of crush resistance of the particulate, and (d) at a temperature of about 300° F. (150° C.), the elastomer-forming component prevents particulate flowback at a flowrate of at least 2,000 ml/min and a pressure drop of at least 40 psi over an interval length of 5 inches (12.7 cm). More preferably, the elastomer-forming component can substantially prevent particulate flowback under 10 repeated stress cycles between about 75% and about 100% of the lower end of the range of crush resistance of the particulate.

According to a particular standard for testing the suitability of an elastomer-forming component for use according to one of the aspects of this invention, the elastomer-forming component has the following characteristic under laboratory testing: after being cured, when tested according to the modified API "Recommended Practices for Evaluating Short-Term Proppant Pack Conductivity" for measuring flowback (a) at a test level of 2 percent by weight of the elastomer-forming component over 20/40 mesh bauxite particulate alone, (b) using filtered water as the flowing medium, (c) under 10 repeated stress cycles between about 6,000 psi and about 8,000 psi, and (c) at a temperature of about 300° F. (150° C.), the elastomer-forming component prevents flowback of the 20/40 mesh bauxite particulate at a flowrate of at least 2,000 ml/min and a pressure drop of at least 40 psi over an interval length of 5 inches (12.7 cm).

Furthermore, although not required under every aspect of this invention, the elastomer-forming component preferably has the following characteristic under laboratory testing: after curing, the elastomer-forming component is stable up to at least 175° F. (80° C.). More preferably, the elastomer-forming component has the following characteristic under laboratory testing: after curing, the elastomer-forming component is stable up to a temperature of at least 300° F. (150° C.). Most preferably, the elastomer-forming component has the following characteristic under laboratory testing: after curing, the elastomer-forming component is stable up to a temperature of at least 390° F. (200° C.). These characteristics are related to the ability of the elastomer-forming component to be used under higher temperature conditions that can be encountered in some subterranean formations.

Finally, it is highly preferably that the component, when in liquid form or in a solvent solution, is capable of forming at least a partial coating upon the particulate. This characteristic can indirectly be demonstrated by the ability to form substantially all the particles of the particulate sample into a flexible and coherent mass. It is expected this desirable property could also be directly observed with an appropriate microscopy technology, for example, scanning electron microscopy.

Without being limited by any theoretical explanation, it is believed that the elastomer-forming component encapsulates at least some of the particulate, which may provide several of the observed and desirable properties and advantages of the invention. For example, this may help contain within the cured capsule any fines that may be created by cycles of stress loadings that may crush some of the encapsulated particulate. This would help prevent the flowback of such fines. Therefore, according to a presently most preferred aspect of the invention, substantially all the particulate and elastomer-forming component are mixed together, so that substantially all the particulate can be encapsulated.

Furthermore, it may be that the elastomer-forming component forms a flexible or resilient coating on the particulate. It is believed that such a coating helps cushion relative movement and stress points of particulate-to-particulate contact to help reduce or prevent crushing, especially during repeated cycles of stress loadings. For this theoretical reason, too, according to a presently most preferred aspect of the invention, substantially all the particulate and elastomer-forming component are mixed together, so that substantially all the particulate can be encapsulated.

In addition, it may be that by mixing the particulate and the elastomer-forming component together shortly before actual use allows for placement of the proppant pack into a subterranean formation before the elastomer-forming component has completely cured, which may provide for some particle-to-particle bonding or adherence. For this theoretical reason, too, according to a presently preferred aspect of the invention, the particulate and the elastomer-forming component are mixed at the well site, including for the possible advantages that may result from using the combination promptly.

If desired, it is expected that these and other possible theoretical explanations for some of the benefits and advantages of the invention can be probed without undue experimentation by those skilled in the art.

According to a presently most preferred embodiment of the invention, the elastomer-forming component forms a silicone rubber upon curing. Without being limited by any theoretical explanation of the invention, silicone rubbers tend to have higher thermal stability than many other types of polymeric materials.

According to a presently most preferred embodiment of the invention, a solvent solution for the elastomer-forming component comprises at least one member selected from the group consisting of: crude oil, petroleum distillates, alcohol, butyl alcohol, isopropyl alcohol, a heavy aromatic solvent, xylene, toluene, heavy aromatic naphta, mutual solvents, ethylene glycol monobutyl ether, propylene carbonate, and n-methylpyrolidone. Of course, it is expected that other solvent solutions can be used according to the invention.

According to a presently most preferred embodiment of the invention, the elastomer-forming component is present in an effective amount relative to the particulate to form, under conditions of sufficient stress loading, a flexible and coherent mass.

According to a presently most preferred embodiment of the invention, the elastomer-forming component is present in an amount of at least about 0.5 percent by weight of the particulate. It would be expected that too little of the elastomer-forming component would be unable to form the particulate into a flexible, coherent proppant pack.

According to a presently preferred embodiment of the invention, the elastomer-forming component is present in an amount of from about 0.5 to about 4 percent by weight of the particulate. It is believed that too much might risk plugging the proppant pack to be formed, i.e., excessively reduce the conductivity of the proppant pack.

More preferably, the elastomer-forming component is present in an amount of about 1 to about 3 percent by weight of the particulate. According to the presently most preferred embodiment of the invention, the elastomer-forming component is present in the amount of about 2 percent by weight of the particulate.

The particulate may comprise substantially any substrate material that does not undesirable chemically interact with other components used in treating the subterranean formation. The particulate comprises, for example, at least one member selected from the group consisting of sand, ceramic particles, resin coated beads, hardened resin beads, sintered bauxite, metal particles, and glass particles.

For high stress application, the particulate preferably comprises at least one member selected from the group consisting of ceramic particles and bauxite. These materials have relatively high crush resistance, and, therefore, are more suitable for use in subterranean formations that may be subjected to higher stress loading situations. As understood herein, higher stress loadings means greater than about 2,000 psi. Because of its high crush resistance, sintered bauxite is especially preferred for high stress applications.

For use as a proppant, the particulate typically comprises particle sizes in the range of about 12/20 mesh to about 40/60 mesh, and 20/40 mesh is one of the most typical and preferred mesh sizes.

The particulate can comprise an additional material that is admixed with a particulate and introduced into a subterranean formation to reduce particulate flowback. In this instance the additional substrate material may comprise glass, ceramic, carbon composites, natural or synthetic polymers, or metal and the like in the form of fibers, flakes, ribbons, beads, shavings, platelets and the like. In this instance, the additional substrate material generally will be admixed with the particulate in an amount of from about 0.1 to about 5 percent by weight of the particulate.

The fluid for carrying the particulate into the subterranean formation can comprise a wide variety of materials. For example, the fluid can comprise water, guar, a crosslinker, and a breaker. Of course, it is preferable that the elastomer-forming component and the crosslinker-breaker system of the fluid do not interfere with one another. The fluid can comprise substantially any aqueous fluid having a linear gel viscosity or cross-linked gel viscosity of greater than 18 centipoise. Alternatively, the fluid for the mixture can comprise a foam. The foam typically would comprise a surfactant and a foamer. The foamer is preferably selected from the group consisting of nitrogen or carbon dioxide.

In many well treatment applications including the methods of the present invention, the mixture can further comprise at least one member selected from the group consisting of scale inhibitor, biocide, crosslinker, breaker, buffer, paraffin inhibitor, and corrosion inhibitor. Of course, in such cases it is most preferably that the elastomer-forming component does not interfere with the function of any other member present in the mixture.

Preferably, the elastomer-forming component and the particulate are mixed together prior to mixing with the fluid. It is to be understood, of course, and as well known in the art, that such mixing can be accomplished at a well site either in a batch process or in a more continuous process "on the fly," and using either process prior to mixing with the fluid.

The methods according to the invention can be used as part of various well treatment procedures. Generally, the step of introducing the mixture into the subterranean formation further comprises the step of controlling the conditions such that at least a portion of the particulate and at least a portion of the elastomer-forming component are deposited at a desired location in the formation. More particularly, a least a portion of the particulate and at least a portion of the elastomer-forming component are deposited for gravel packing a subterranean portion of the well. Or, the method can be used as part of a formation fracturing procedure, wherein a well treatment fluid is introduced through a wellbore into the subterranean formation at a rate and pressure sufficient to create at least one fracture in the formation; and the step of introducing the mixture into the subterranean formation further comprises controlling the conditions such that at least a portion of the particulate and at least a portion of the elastomer-forming material is deposited into the fracture created in the formation.

Furthermore, the methods according to the present invention can be used as the well treatment fluid for a fracturing treatment or only as a "tail-end" portion of a fracturing treatment.

The methods according to the present invention can further include the step of shutting in the well for a sufficient time to allow the deposited particulate and elastomer-forming component to form a flexible and coherent mass.

In case the elastomer-forming component is not self-curing, a curing agent can be introduced into the formation after the particulate and the elastomer-forming component have been introduced into the subterranean formation in a subsequent over-flushing step. This subsequent step can prevent the elastomer-forming component from curing until a desired time, such as after it has been introduced into a desired location in a subterranean formation. Thus, the methods according to the present invention can further include the steps of: introducing into the subterranean formation a curing agent for the elastomer-forming component; and shutting in the well for a sufficient time to allow the deposited elastomer-forming component to substantially cure under the formation conditions.

The invention will be better appreciated by reference to the following experimental examples.

Reference Test

A reference or control test was conducted to provide a comparative reference of using a particulate in the API simulated fracture cell without any elastomer-forming component.

Ohio sandstone cores were selected to simulate a representative subterranean formation, and placed in the API cell.

In this reference example, the particulate was sintered bauxite ("Carbo-HSP"). The particulate mesh size was a typical 20/40 mesh. The average particle diameter was 0.027 inch (0.69 mm).

For this reference example test, the test fluid was simply deionized water.

The slurried mixture was placed in the proppant bed of the API cell defined between the two Ohio sandstone cores. The cell was then placed in the hydraulic press. Excess fluid was allowed to flow out of the cell.

The cell was subjected to a stress loading of about 8,080 psi and a temperature of about 287° F. (141.5° C.) for 18 hours.

The initial conductivity of the proppant pack before flowback testing was measured to be 3580 md.ft, and the permeability was 258 Darcies.

During the flowback test, using water as the flowing medium, particulate was produced within 3.4 minutes at a flow rate of 157 ml/min, a velocity of 1.63 cm/s, a pressure drop of 1.13 psi over an interval length of 5 inches (12.7 cm). About 43% of the particulate was produced during the flowback test.

EXAMPLE I

The effectiveness of an elastomer-forming coating according to the invention is illustrated by the following test according to the API simulated fracture cell procedure.

Ohio sandstone cores were selected to simulate a representative subterranean formation, and placed in the API cell.

In this example, the particulate was sintered bauxite ("Carbo-HSP"). The particulate mesh size was a typical 20/40 mesh. The average particle diameter was 0.027 inch (0.69 mm).

The particulate was dry coated with about 2% by weight of a un-cured silicone rubber component, known as "Wacker E-70," commercially available from Wacker Silicones Corporation, 3301 Sutton Road, Adrian, Mich. 49221-9397, and at www.wackersilicones.com. This particular component is known to cure in less than one hour under moisture or aqueous conditions at room temperature.

For this example test, the particulate coated with un-cured silicone rubber component were mixed with deionized water. It is to be understood, of course, that in the field a different fluid for carrying the particulate into a subterranean formation would probably be used.

The slurried mixture was placed in the proppant bed defined between the two Ohio sandstone cores placed in the API cell. The cell was then placed in the hydraulic press. Excess fluid was allowed to flow out of the cell.

The cell was subjected to a stress loading of about 8,020 psi and a temperature of about 303° F. (150.4° C.) for 18 hours.

Using filtered water as the flowing medium, the initial conductivity of the proppant pack before flowback was measured at 3158 md.ft. Permeability was 238 Darcies.

During the flowback test, the proppant pack was subjected to stress cycles from 8,000 down to 6,000 and back to 8,000 psi. This stress cycle was repeated 10 times. No particulate was produced even under the following maximum flowing conditions, including: a flowrate of 2352 ml/min, a velocity of 25.4 cm/s, and a pressure drop of 47.8 psi over an interval length of 5 inches (12.7 cm).

After this testing, the proppant pack was removed from the API simulated fracture cell and inspected. The proppant pack looked nice and clean. Even embedment signs were visible on bottom core. The proppant pack was a flexible, coherent mass. FIGS. 1 and 2 are photographs of this example of a proppant pack.

EXAMPLE II

The effectiveness of an elastomer-forming coating according to the invention is also illustrated by the following test according to the API simulated fracture cell procedure.

Ohio sandstone cores were selected to simulate a representative subterranean formation, and placed in the API cell.

In this example, the particulate was sintered bauxite ("Carbo-HSP"). The particulate mesh size was a typical 20/40 mesh. The average particle diameter was 0.027 inch (0.69 mm).

The particulate was dry coated with about 2% by weight of a uncured silicone rubber component, known as "Wacker E-70," commercially available from Wacker Silicones Corporation, 3301 Sutton Road, Adrian, Mich. 49221-9397, and at www.wackersilicones.com. This particular component is known to cure in less than one hour under moisture or aqueous conditions at room temperature.

For this example, the test fluid was aqueous "Hybor H4410" commercially available from Halliburton Energy Services, and that is basically comprised of water viscosified with a polymeric guar. This test fluid is representative of common aqueous well treatment fluids. The fluid was added to the dry-coated particulate. The mixture was vigorously shaken. All particulate grains appeared homogeneously mixed in the crosslinked fluid. Visual inspection indicated no grain to grain contact in the slurry. The silicone rubber component did not appear to interfere with the crosslinked fluid.

The slurried mixture was placed in the proppant bed defined between the two Ohio sandstone cores placed in the API cell. The cell was then placed in the hydraulic press. Excess fluid was allowed to flow out of the cell.

The cell was subjected to a stress loading of about 8,000 psi and a temperature of about 307° F. (152.6° C.) for 18 hours.

Using water as the flowing medium, the initial conductivity of the proppant pack before flowback was measured at 3499 md.ft, permeability was 276 D. Absolute permeability, before flowback, was measured at 199 D.

The proppant flowback test showed that particulate was not produced until the following extreme conditions were applied, including: an average stress of about 7,940 psi, an average temperature of about 281° F. (138.4° C.), a water flow rate of 2489 ml/min, a velocity of 28.2 cm/s, and a pressure drop of 91.1 psi over an interval length of 5 inches (12.7 cm).

The invention is described with respect to presently preferred embodiments, but is not limited to the described embodiments. It will be readily apparent to those of ordinary skill in the art that numerous modifications may be made to the invention without departing from the scope and spirit of the invention.

What is claimed is:

1. A method of treating a subterranean formation comprising the steps of:
    (a) forming a mixture comprising:
        (i) a particulate,
        (ii) an elastomer-forming component in a liquid form or in a solvent solution, and
        (iii) a fluid for carrying the particulate through a well into the subterranean formation; and
    (b) introducing the mixture into the subterranean formation;
    wherein the elastomer-forming component has the following characteristics under laboratory testing:
        (a) the component, by itself or with a curing agent, is capable of being cured to form an elastomeric material, and
        (b) the component, at a test level of 2 percent by weight over the particulate alone and under conditions of sufficient stress loading, is capable of forming the particulate into a flexible and coherent mass.

2. A method of treating a subterranean formation comprising the steps of:
    (a) at a well site, mixing:
        (i) a particulate, and
        (ii) an elastomer-forming component in a liquid form or in a solvent solution;
    (b) subsequently admixing a fluid for carrying the particulate through the well into the subterranean formation to form a mixture; and
    (c) introducing the mixture through the well into the subterranean formation;
    wherein the elastomer-forming component has the following characteristics under laboratory testing:
        (a) the component, by itself or with a curing agent, is capable of being cured to form an elastomeric material, and
        (b) the component, at a test level of 2 percent by weight over the particulate alone and under conditions of sufficient stress loading, is capable of forming the particulate into a flexible and coherent mass.

3. A method of treating a subterranean formation comprising the steps of:
    (a) forming a mixture comprising:
        (i) a particulate,
        (ii) an elastomer-forming component in a liquid form or in a solvent solution, and
        (iii) a fluid for carrying the particulate through a well into the subterranean formation; and
    (b) introducing the mixture into the subterranean formation;
    wherein the elastomer-forming component has the following characteristics under laboratory testing:
        (a) the component, by itself or with a curing agent, is capable of being cured to form an elastomeric material, and (b) the component, at a test level of 2 percent by weight over the particulate alone and under conditions of sufficient stress loading at about the lower end of the crush resistance range of the particulate, is capable of forming the particulate into a flexible and coherent mass.

4. A method of treating a subterranean formation comprising the steps of:
(a) forming a mixture comprising:
(i) a particulate,
(ii) an elastomer-forming component in a liquid form or in a solvent solution, that is dry-coated onto the particulate, and
(iii) a fluid for carrying the particulate through a well into the subterranean formation; and
(b) introducing the mixture into the subterranean formation;
wherein the elastomer-forming component has the following characteristics under laboratory testing:
(a) the component, by itself or with a curing agent, is capable of being cured to form an elastomeric material, and
(b) the component, at a test level of 2 percent by weight over a test sample of 20/40 mesh sintered bauxite alone and under conditions of stress loading at about 8,000 psi and a temperature of about 300° F. (150° C.), is capable of forming the test sample of into a flexible and coherent mass.

5. The method according to any one of claims 1 or 4, wherein the elastomer-forming component has the following characteristic under laboratory testing:
after being cured, when tested according to the API "Recommended Practices for Evaluating Short-Term Proppant Pack Conductivity"
(a) at a test level of 2 percent by weight of the elastomer-forming component over the particulate alone,
(b) using filtered water as the flowing medium,
(c) applying a stress loading of about 100% of the lower end of the range of crush resistance of the particulate, and
(d) at a temperature of about 300° F. (150° C.),
the elastomer-forming component does not reduce the initial conductivity of the particulate by more than 30 percent relative to the particulate alone.

6. The method according to claim 5 wherein the elastomer-forming component does not reduce the initial conductivity of the particulate by more than 20 percent relative to the particulate alone.

7. The method according to any one of claims 1 or 4, wherein the elastomer-forming component has the following characteristic under laboratory testing:
after being cured, when tested according to the modified API "Recommended Practices for Evaluating Short-Term Proppant Pack Conductivity" for measuring flowback
(a) at a test level of 2 percent by weight of the elastomer-forming component over the particulate alone,
(b) using filtered water as the flowing medium,
(c) at a stress loading of about 100% of the lower end of the range of crush resistance of the particulate, and
(d) at a temperature of about 300° F. (150° C.),
the elastomer-forming component prevents particulate flowback at a flow rate of at least 2,000 ml/min and a pressure drop of at least 40 psi over an interval length of 5 inches (12.7 cm).

8. The method according to any one of claims 1 or 4, wherein the elastomer-forming component has the following characteristic under laboratory testing:
after being cured, when tested according to the modified API "Recommended Practices for Evaluating Short-Term Proppant Pack Conductivity" for measuring flowback
(a) at a test level of 2 percent by weight of the elastomer-forming component over the particulate alone,
(b) using filtered water as the flowing medium,
(c) under 10 repeated stress cycles between about 75% and about 100% of the lower end of the range of crush resistance of the particulate, and
(d) at a temperature of about 300° F. (150° C.),
the elastomer-forming component prevents flowback of the particulate at a flow rate of at least 2,000 ml/min and a pressure drop of at least 40 psi over an interval length of 5 inches (12.7 cm).

9. The method according to any one of claims 1 or 4, wherein the elastomer-forming component has the following characteristic under laboratory testing:
after being cured, when tested according to the modified API "Recommended Practices for Evaluating Short-Term Proppant Pack Conductivity" for measuring flowback
(a) at a test level of 2 percent by weight of the elastomer-forming component over 20/40 mesh bauxite particulate alone,
(b) using filtered water as the flowing medium,
(c) under 10 repeated stress cycles between about 6,000 psi and about 8,000 psi, and
(c) at a temperature of about 300° F. (150° C.),
the elastomer-forming component prevents flowback of the 20/40 mesh bauxite particulate at a flow rate of at least 2,000 ml/min and a pressure drop of at least 40 psi over an interval length of 5 inches (12.7 cm).

10. The method according to any one of claims 1 or 4, wherein the elastomer-forming component has the following characteristic under laboratory testing:
after curing, the elastomer-forming component is stable up to a temperature of at least 300° F. (150° C.).

11. The method according to any one of claims 1 or 4, wherein the elastomer-forming component has the following characteristic under laboratory testing:
the component, when in liquid form or in a solvent solution, is capable of forming at least a partial coating upon the particulate.

12. The method according to any one of claims 1 or 4, wherein the elastomer-forming component forms a silicone rubber upon curing.

13. The method according to any one of claims 1 or 4, or wherein a solvent solution for the elastomer-forming component comprises at least one member selected from the group consisting of: crude oil, petroleum distillates, alcohol, butyl alcohol, isopropyl alcohol, a heavy aromatic solvent, xylene, toluene, heavy aromatic naphtha, mutual solvents, ethylene glycol monobutyl ether, propylene carbonate, and n-methylpyrolidone.

14. The method according to any one of claim 1 or 4, wherein the elastomer-forming component is present in an effective amount relative to the particulate to form, under conditions of sufficient stress loading, a flexible and coherent mass.

15. The method according to any one of claims 1 or 4, wherein the elastomer-forming component is present in an amount of at least about 0.5 percent by weight of the particulate.

16. The method according to any one of claims 1 or 4, wherein the elastomer-forming component is present in an amount of from about 0.5 to about 4 percent by weight of the particulate.

17. The method according to any one of claims 1 or 4, wherein the particulate comprises at least one member selected from the group consisting of sand, ceramic particles, resin coated beads, hardened resin beads, sintered bauxite, metal particles, and glass particles.

18. The method according to any one of claims 1 or 4, wherein the particulate additionally comprises another material selected from the group of particles comprising metal, natural or synthetic polymers, ceramics and glass.

19. The method of claim 18 wherein said another material is in the form of fibers, beads, ribbons, flakes, platelets or shavings.

20. The method of claim 18 wherein said another material is present in an amount of from about 0.1 to about 5% by weight of the particulate material.

21. The method according to any one of claims 1 or 4, wherein the particulate comprises particle sizes in the range of about 12/20 mesh to about 40/60 mesh.

22. The method according to any one of claims 1 or 4, wherein the fluid comprises water, guar, a crosslinker, and a breaker.

23. The method according to any one of claims 1 or 4, wherein the mixture further comprises at least one member selected from the group consisting of scale inhibitor, biocide, crosslinker, breaker, buffer, paraffin inhibitor, and corrosion inhibitor.

24. The method according to any one of claims 1 or 4, wherein a least a portion of the particulate and at least a portion of the elastomer-forming component are deposited for gravel packing a subterranean portion of the well.

25. The method according to any one of claims 1 or 4, further comprising the step of introducing a fluid through a wellbore into the subterranean formation at a rate and pressure sufficient to create at least one fracture in the formation; and
wherein the step of introducing the mixture into the subterranean formation further comprises the step of controlling the conditions such that at least a portion of the particulate and at least a portion of the elastomer-forming material is deposited into the fracture created in the formation.

26. The method according to any one of claims 1 or 4, further comprising the step of:
shutting-in the well for a sufficient time to allow the deposited particulate and elastomer-forming component to form a flexible and coherent mass.

27. A method of treating a subterranean formation comprising the steps of:
(a) forming a mixture comprising:
(i) a particulate,
(ii) an elastomer-forming component in a liquid form or in a solvent solution, and
(iii) a fluid for carrying the particulate through a well into the subterranean formation; and
(b) introducing the mixture into the subterranean formation;
wherein the elastomer-forming component is present in a sufficient amount relative to the particulate alone to form the particulate into a flexible and coherent mass in the subterranean formation; and
wherein the elastomer-forming component has the following characteristic under laboratory testing:
after being cured, when tested according to the API "Recommended Practices for Evaluating Short-Term Proppant Pack Conductivity"
(a) at a test level of 2 percent by weight of the elastomer-forming component over the particulate alone,
(b) using filtered water as the flowing medium,
(c) applying a stress loading of about 100% of the lower end of the range of crush resistance of the particulate, and
(d) at a temperature of about 300° F. (150° C.
the elastomer-forming component does not reduce the initial conductivity of the particulate by more than 30 percent relative to the particulate alone.

28. The method according to claim 27, wherein the elastomer-forming component does not reduce the initial conductivity of the particulate by more than 20 percent relative to the particulate alone.

29. A method of treating a subterranean formation comprising the steps of:
(a) forming a mixture comprising:
(i) a particulate,
(ii) an elastomer-forming component in a liquid form or in a solvent solution, and
(iii) a fluid for carrying the particulate through a well into the subterranean formation; and
(b) introducing the mixture into the subterranean formation;
wherein the elastomer-forming component is present in a sufficient amount relative to the particulate alone to form the particulate into a flexible and coherent mass in the subterranean formation; and
wherein the elastomer-forming component has the following characteristic under laboratory testing:
after being cured, when tested according to the modified API "Recommended Practices for Evaluating Short-Term Proppant Pack Conductivity" for measuring flowback
(a) at a test level of 2 percent by weight of the elastomer-forming component over the particulate alone,
(b) using filtered water as the flowing medium,
(c) at a stress loading of about 100% of the lower end of the range of crush resistance of the particulate, and
(d) at a temperature of about 300° F. (150° C.),
the elastomer-forming component prevents particulate flowback at a flow rate of at least 2,000 ml/min and a pressure drop of at least 40 psi over an interval length of 5 inches (12.7 cm).

30. A method of treating a subterranean formation comprising the steps of:
(a) forming a mixture comprising:
(i) a particulate,
(ii) an elastomer-forming component in a liquid form or in a solvent solution, and
(iii) a fluid for carrying the particulate through a well into the subterranean formation; and
(b) introducing the mixture into the subterranean formation;
wherein the elastomer-forming component is present in a sufficient amount relative to the particulate alone to form the particulate into a flexible and coherent mass in the subterranean formation; and
wherein the elastomer-forming component has the following characteristic under laboratory testing:
after being cured, when tested according to the modified API "Recommended Practices for Evaluating Short-Term Proppant Pack Conductivity" for measuring flowback
(a) at a test level of 2 percent by weight of the elastomer-forming component over the particulate alone,
(b) using filtered water as the flowing medium,
(c) under 10 repeated stress cycles between about 75% and about 100% of the lower end of the range of crush resistance of the particulate, and (d) at a temperature of about 300° F. (150° C.), the elastomer-forming component prevents flowback of the particulate at a flow rate of at least 2,000 ml/min and a pressure drop of at least 40 psi over an interval length of 5 inches (12.7 cm).

31. A method of treating a subterranean formation comprising the steps of:
 (a) forming a mixture comprising:
  (i) a particulate,
  (ii) an elastomer-forming component in a liquid form or in a solvent solution, and
  (iii) a fluid for carrying the particulate through a well into the subterranean formation; and
 (b) introducing the mixture into the subterranean formation;
 wherein the elastomer-forming component is present in a sufficient amount relative to the particulate alone to form the particulate into a flexible and coherent mass in the subterranean formation; and
 wherein the elastomer-forming component has the following characteristic under laboratory testing:
 after being cured, when tested according to the modified API "Recommended Practices for Evaluating Short-Term Proppant Pack Conductivity" for measuring flowback
  (a) at a test level of 2 percent by weight of the elastomer-forming component over 20/40 mesh bauxite particulate alone,
  (b) using filtered water as the flowing medium,
  (c) under 10 repeated stress cycles between about 6,000 psi and about 8,000 psi, and
  (c) at a temperature of about 300° F. (150° C.,
 the elastomer-forming component prevents flowback of the 20/40 mesh bauxite particulate at a flow rate of at least 2,000 ml/min and a pressure drop of at least 40 psi over an interval length of 5 inches (12.7 cm).

32. A method of treating a subterranean formation comprising the steps of:
 (a) forming a mixture comprising:
  (i) a particulate,
  (ii) an elastomer-forming component in a liquid form or in a solvent solution, and
  (iii) a fluid for carrying the particulate through a well into the subterranean formation; and
 (b) introducing the mixture into the subterranean formation;
 wherein the elastomer-forming component is present in a sufficient amount relative to the particulate alone to form the particulate into a flexible and coherent mass in the subterranean formation; and
 wherein the elastomer-forming component forms a silicone rubber upon curing.

33. A method of treating a subterranean formation comprising the steps of:
 (a) forming a mixture comprising:
  (i) a particulate,
  (ii) an elastomer-forming component in a liquid form or in a solvent solution, and
  (iii) a fluid for carrying the particulate through a well into the subterranean formation; and
 (b) introducing the mixture into the subterranean formation;
 wherein the elastomer-forming component is present in a sufficient amount relative to the particulate alone to form the particulate into a flexible and coherent mass in the subterranean formation;
 wherein the particulate comprises at least one member selected from the group consisting of sand, ceramic particles, resin coated beads, hardened resin beads, sintered bauxite, metal particles, and glass particles;
 wherein the particulate additionally comprises another material selected from the group of particles comprising metal, natural or synthetic polymers, ceramics and glass; and
 wherein said another material is present in an amount of from about 0.1 to about 5% by weight of the particulate material.

34. The method according to any one of claims 27–32, wherein the elastomer-forming component has the following characteristic under laboratory testing:
 after curing, the elastomer-forming component is stable up to a temperature of at least 300° F. (150° C.).

35. The method according to any one of claims 27–32, wherein the elastomer-forming component has the following characteristic under laboratory testing:
 the component, when in liquid form or in a solvent solution, is capable of forming at least a partial coating upon the particulate.

36. The method according to any one of claims 27–32, wherein the elastomer-forming component forms a silicone rubber upon curing.

37. The method according to any one of claims 27–32, wherein the elastomer-forming component is present in an amount of from about 0.5 to about 4 percent by weight of the particulate.

38. The method according to any one of claims 27–32, wherein the particulate comprises at least one member selected from the group consisting of sand, ceramic particles, resin coated beads, hardened resin beads, sintered bauxite, metal particles, and glass particles; wherein the particulate additionally comprises another material selected from the group of particles comprising metal, natural or synthetic polymers, ceramics and glass; and wherein said another material is present in an amount of from about 0.1 to about 5% by weight of the particulate material.

39. The method according to any one 27–32, further comprising the step of introducing a fluid through a wellbore into the subterranean formation at a rate and pressure sufficient to create at least one fracture in the formation; and
 wherein the step of introducing the mixture into the subterranean formation further comprises the step of controlling the conditions such that at least a portion of the particulate and at least a portion of the elastomer-forming material is deposited into the fracture created in the formation.

* * * * *